(12) United States Patent
Ishii

(10) Patent No.: US 8,786,581 B2
(45) Date of Patent: Jul. 22, 2014

(54) MOBILE INFORMATION APPARATUS AND DISPLAY CONTROL METHOD

(75) Inventor: Junichi Ishii, Minato-ku (JP)

(73) Assignee: NEC Corporation, Tokyo (JP)

( * ) Notice: Subject to any disclaimer, the term of this patent is extended or adjusted under 35 U.S.C. 154(b) by 83 days.

(21) Appl. No.: 13/496,448

(22) PCT Filed: Aug. 5, 2010

(86) PCT No.: PCT/JP2010/063249
§ 371 (c)(1),
(2), (4) Date: Mar. 15, 2012

(87) PCT Pub. No.: WO2011/033877
PCT Pub. Date: Mar. 24, 2011

(65) Prior Publication Data
US 2012/0176353 A1    Jul. 12, 2012

(30) Foreign Application Priority Data

Sep. 16, 2009  (JP) .................................. 2009-214440
Oct. 14, 2009  (JP) .................................. 2009-237075

(51) Int. Cl.
*G06F 3/038* (2013.01)
(52) U.S. Cl.
USPC ......................................... 345/204; 345/214
(58) Field of Classification Search
None
See application file for complete search history.

(56) References Cited

U.S. PATENT DOCUMENTS

| | | |
|---|---|---|
| 6,072,476 A | 6/2000 | Harada et al. |
| 6,788,292 B1 * | 9/2004 | Nako et al. ..................... 345/173 |

FOREIGN PATENT DOCUMENTS

| | | |
|---|---|---|
| CN | 1292112 A | 4/2001 |
| CN | 101187546 A | 5/2008 |
| CN | 101277321 A | 10/2008 |
| JP | 07146845 A | 6/1995 |
| JP | 09-026769 A | 1/1997 |
| JP | 11-288259 A | 10/1999 |
| JP | 2003-157066 A | 5/2003 |
| JP | 2003-158573 A | 5/2003 |
| JP | 2004112040 A | 4/2004 |
| JP | 2005-236597 A | 9/2005 |
| JP | 2006-014056 A | 1/2006 |
| JP | 2006004093 A | 1/2006 |
| JP | 2006-101331 A | 4/2006 |
| JP | 2006-163294 A | 6/2006 |
| JP | 2007-281864 A | 10/2007 |

OTHER PUBLICATIONS

Office Action dated Jul. 19, 2013, issued by the State Intellectual Property Office of the People's Republic of China in counterpart Chinese Application No. 201080041615.9.
Communication dated Apr. 10, 2014, issued by the State Intellectual Property Office of the People's Republic of China in corresponding Application No. 201080041615.9.
Office Action dated Apr. 22, 2014, issued by the Japan Patent Office in corresponding Japanese Application No. 2011-531849.

* cited by examiner

*Primary Examiner* — Jason Olson
(74) *Attorney, Agent, or Firm* — Sughrue Mion, PLLC

(57) ABSTRACT

Multiple displays are arranged such that their display surfaces are arrayed side by side. A measurement section measures orientation information about apparatus orientation. A control section determines the display surface a user is viewing from among multiple displays, based on the orientation information measured by the measurement section. The control section causes the display surface of displays, other than the display surface determined as being viewed by the user, to become darker than the display surface of the display determined as being viewed by the user.

11 Claims, 10 Drawing Sheets

MOBILE INFORMATION APPARATUS AND DISPLAY CONTROL METHOD

CROSS REFERENCE TO RELATED APPLICATION

This application is a National Stage of International Application No. PCT/JP2010/063249, filed on Aug. 5, 2010, claiming priority based on Japanese Patent Application Nos. 2009-214440, filed Sep. 16, 2009 and JP 2009-237075, filed Oct. 14, 2009, the contents of all of which are incorporated herein by reference in their entirety.

TECHNICAL FIELD

The present invention relates to a technique for controlling display of a mobile information apparatus having multiple screens.

BACKGROUND ART

Some mobile information apparatuses have multiple screens. A mobile phone is representative of this kind of mobile information apparatus (see Patent Literature 1). As more complex functions and a larger-sized contents are realized, mobile phones are required to have a capability of displaying more information. In order to satisfy such a demand, a multi-screen mobile phone having multiple screens is being examined, in addition to a higher resolution and a larger screen. As one method for using a multi-screen mobile phone, it plausible for a user to view different screens by switching his line of sight from one screen to another screen from among multiple arrayed screens on the mobile information apparatus.

In a mobile information apparatus having multiple screens, however, power consumed by the display sections generally increases in proportion to the number of the display sections. Therefore, it is difficult to realize low power consumption in a mobile information apparatus having multiple screens, and therefore, it is difficult to operate it by a battery for a long time.

To cope with this problem5, there is proposed a technique for controlling display of multiple screens according to the state of the mobile information apparatus (see Patent Literatures 1 to 3).

Patent Literature 1 discloses, as a fifth exemplary embodiment, a technique for controlling the brightness of the screens provided for a body and a lid part, respectively, according to the folding angle formed by the body and the lid part, the body and the lid part being openably and closably connected with each other such that their screens face each other when they are closed.

Patent Literature 2 discloses, as a fourth exemplary embodiment, a mobile phone having two cases on the body part side and the lid part side, respectively, which are openably and closably connected with each other, the case on the lid part side being provided with a main LCD to be used in an open state and the case on the body side being provided with a sub LCD mainly to be used mainly in a closed state. The mobile phone switches on and off the light of the main LCD and the light of the sub LCD on and off according to the direction in which it is placed and the open/closed state.

Patent Literature 3 discloses a technique in which a mobile terminal apparatus is provided with displays on the front side and back side of a case, respectively, and is also provided with a gravity sensor that controls on/off of the front-side display and the back-side display according to an angle of the case obtained by the gravity sensor.

There is also proposed a technique in which it is determined whether or not a user is looking at a display or not, from image data obtained by a camera, and the brightness of the display is decreased when the user is not looking at the display (see Patent Literature 4).

A mobile terminal apparatus described in Patent Document 4 is not provided with multiple displays but is provided with one display, and it is further provided with a camera. The mobile terminal apparatus determines whether or not the user is looking at the display or not by processing image data obtained by the camera. When the user is not looking at the display, the mobile terminal apparatus decreases the brightness of the display.

CITATION LIST

Patent Literature

Patent Literature 1: JP2003-157066A
Patent Literature 2: JP2006-163294A
Patent Literature 3: JP2007-281864A
Patent Literature 4: JP2005-236597A

SUMMARY OF INVENTION

Technical Problem

None of the techniques of Patent Literature 1 to 4, however, controls the display based upon the screen which user is viewing as the user views multiple screens by changing his/her line of sight from one screen to another screen among the plurality of arrayed screens. Therefore, it is impossible to reduce power consumption of the screen which the user is not viewing, while ensuring that the screen which the user is viewing is viewable.

An object of the present invention is to provide a technique for, in a mobile information apparatus having multiple screens, reducing power consumption of screens which a user is not viewing while ensuring that the screen which the user is viewing is viewable.

Solution to the Problem

In order to achieve the above object, a mobile information apparatus of the present invention includes:

multiple displays whose display surfaces are arranged side by side;

a measurement section that measures orientation information about apparatus orientation; and a control section that determines the display surface, from among multiple displays, that the user is viewing based on the orientation information measured by said measurement section, and causes the display surface on displays, other than the display surface determined as being viewed by the user, to become darker than the display surface on the display determined as being viewed by the user.

A display control method of the present invention is a display control method for a mobile information apparatus including multiple displays whose display surfaces are arranged side by side, comprising:

measuring orientation information about apparatus orientation;

determining the display surface, from among multiple displays, that the user is viewing based on measured orientation information; and causing a display surface on displays, other than the display surface determined as being viewed by the user, to become darker than the display surface on the display determined as being viewed by the user.

BRIEF DESCRIPTION OF DRAWINGS

FIG. 14B is a diagram showing a full view and a state of use of the mobile communication apparatus according to the fourth example.

DESCRIPTION OF EMBODIMENTS

Exemplary embodiments for practicing the present invention will be described in detail with reference to drawings.

First Exemplary Embodiment

Figure 1:
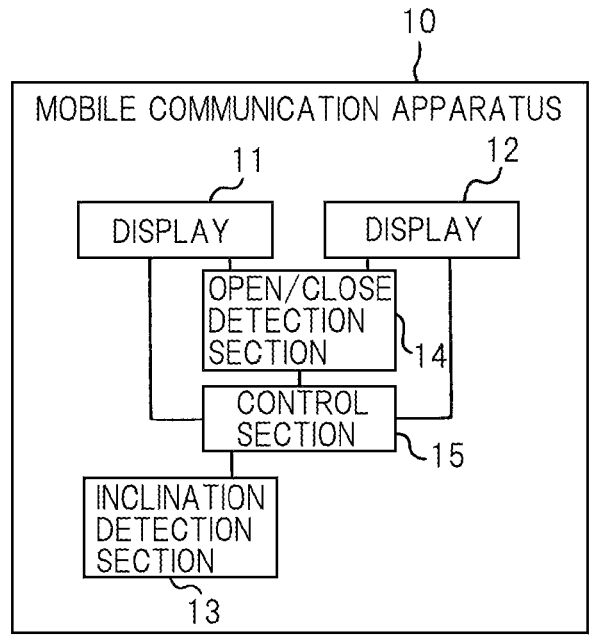
FIG. 1 is a functional block diagram showing a schematic configuration of a mobile communication apparatus according to a first exemplary embodiment.
Figure 2:
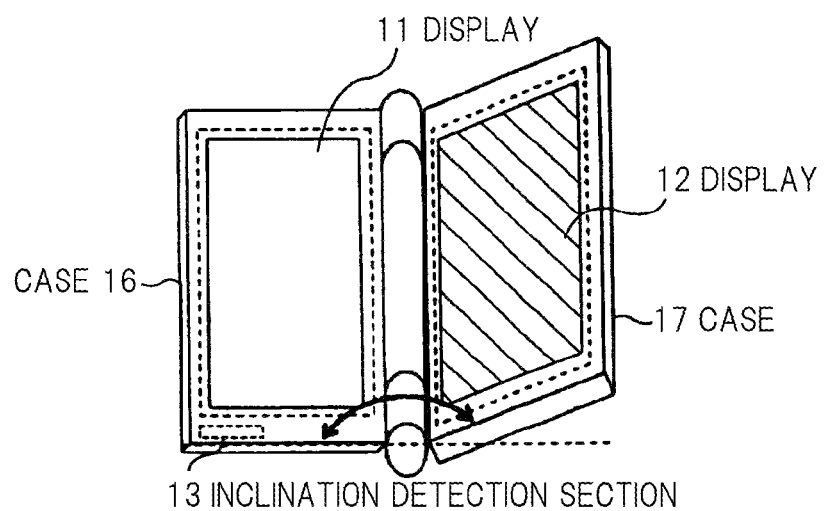
FIG. 2 is a full view showing a schematic structure of the mobile communication apparatus according to the first exemplary embodiment.

FIG. 1 is a functional block diagram showing a schematic configuration of a mobile communication apparatus according to a first exemplary embodiment. FIG. 2 is a full view showing a schematic structure of the mobile communication apparatus according to the first exemplary embodiment.

Referring to FIG. 1, mobile communication apparatus 10 has two displays 11 and 12, inclination detection section 13 and control section 15. Mobile communication apparatus 10 may further have open/close detection section 14.

As shown in FIG. 2, displays 11 and 12 have display surfaces arranged side by side so that a user can view them by switching his line of sight from one screen to the other. As an example, two displays 11 and 12 are implemented in two cases 16 and 17, respectively, being openably and closably connected with each other via a hinge such that the display surfaces face each other when two cases 16 and 17 are closed. It is assumed that it is possible to open two cases 16 and 17 such that the two display surfaces form a relative angle smaller than 180 degrees and maintain this state, as in the example shown in FIG. 2. The user may use mobile communication apparatus 10 in a state in which two cases 16 and 17 are opened such that the two display surfaces are vertically arranged or in a state in which the two display surfaces are horizontally arranged.

Inclination detection section 13 detects the inclination of the display surface of any one of two displays 11 and 12. As in the example shown in FIG. 2, inclination detection section 13 is implemented in case 16 or in case 17, and it detects the inclination of the display surface of the display implemented in the same case.

Control section 15 determines the display surface, to which the user's line of sight is directed, on the display, based on the basis of the inclination detected by inclination detection section 13, and causes a display surface on a display, other than the display surface determined as being the display surface to which the user's line of sight is directed, to become darker than the display surface on the display determined as being the display surface to which the user's line of sight is directed.

In that case, control section 15 calculates, on the basis of the inclination of the display surface detected by inclination detection section 13 and the relative angle between the two display surfaces, the inclination of the other display surface, as an example. Then, control section 15, which views a horizontal plane as a reference plane, determines that a display surface within a predetermined angle range from the reference plane is the display surface to which the user's line of sight is directed.

As an example, control section 15 causes the display surface determined as the display surface to which the line of sight is directed, to have an appropriate brightness and switches off the light of the other display.

Open/close detection section 14 determines whether two cases 16 and 17 are open or closed. In this case, control section 15 determines the display surface to which the user's line of sight is directly only when two cases 16 and 17 are in an open state, and switches off the light of the display other than the display surface to which the line of sight is directed.

In this exemplary embodiment, an example in which the horizontal plane is set as the reference plane has been shown. The present invention, however, is not limited thereto. As another example, the inclination of the reference plane may be set by a predetermined initial operation by the user.

As described above, according to this exemplary embodiment, the display surface to which the user's line of sight is directed is determined on the basis of an inclination (apparatus orientation) detected by inclination detection section 13, and the display surface on the display other than the display surface determined as the display surface to which the line of sight is directed is darkened. Therefore, it is possible to reduce power consumption of the screen which the user is not looking at while ensuring that the screen which the user is viewing is viewable.

First Example

A more specific example of the first exemplary embodiment will be shown as a first example. Here, an example is shown in which a section corresponding to open/close detection section 14 is not provided.

Figure 3A:
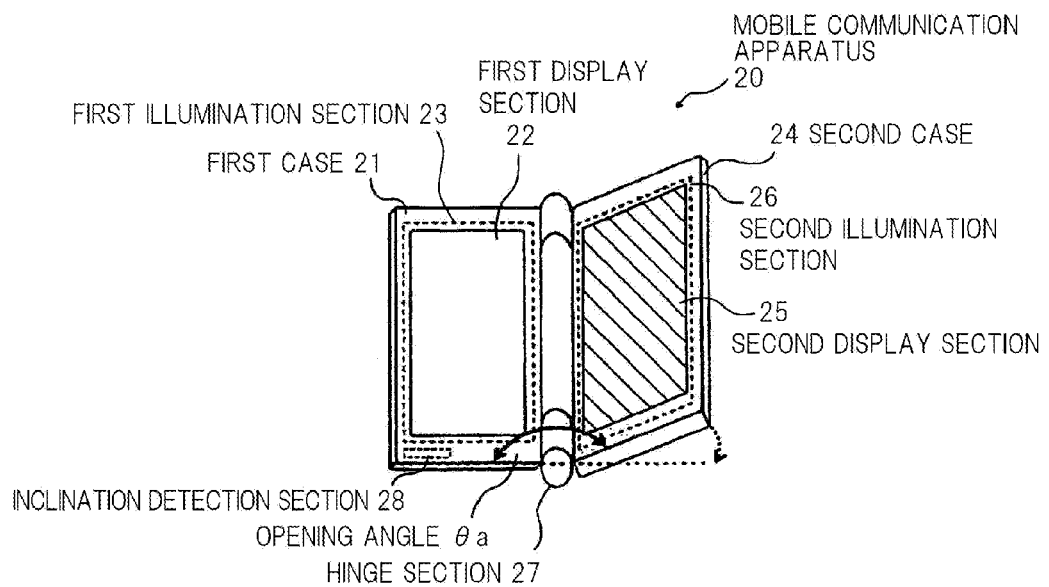
FIG. 3A is a diagram showing a full view and a state of use of the mobile communication apparatus according to a first example.
Figure 3B:
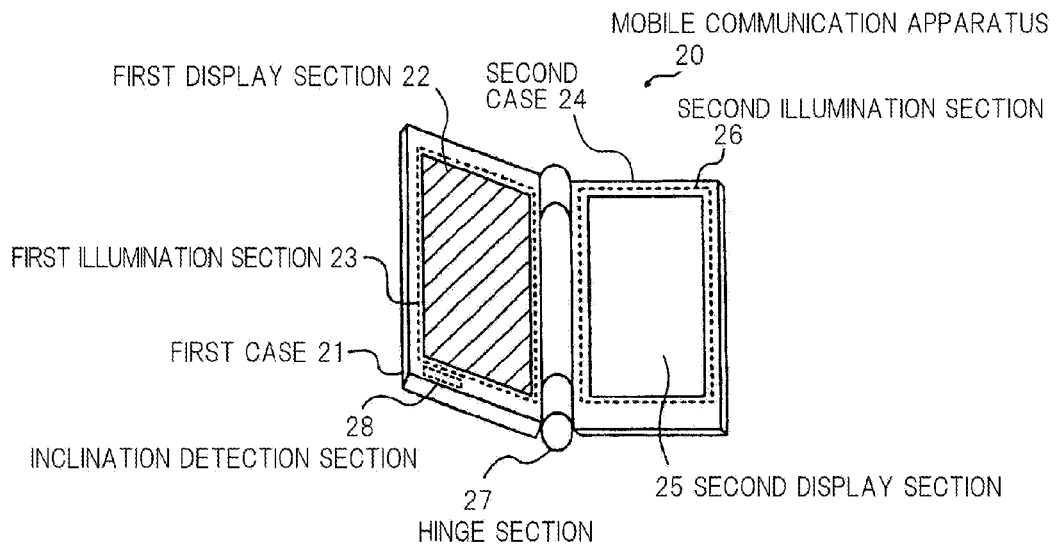
FIG. 3B is a diagram showing a full view and a state of use of the mobile communication apparatus according to the first example.
Figure 4:
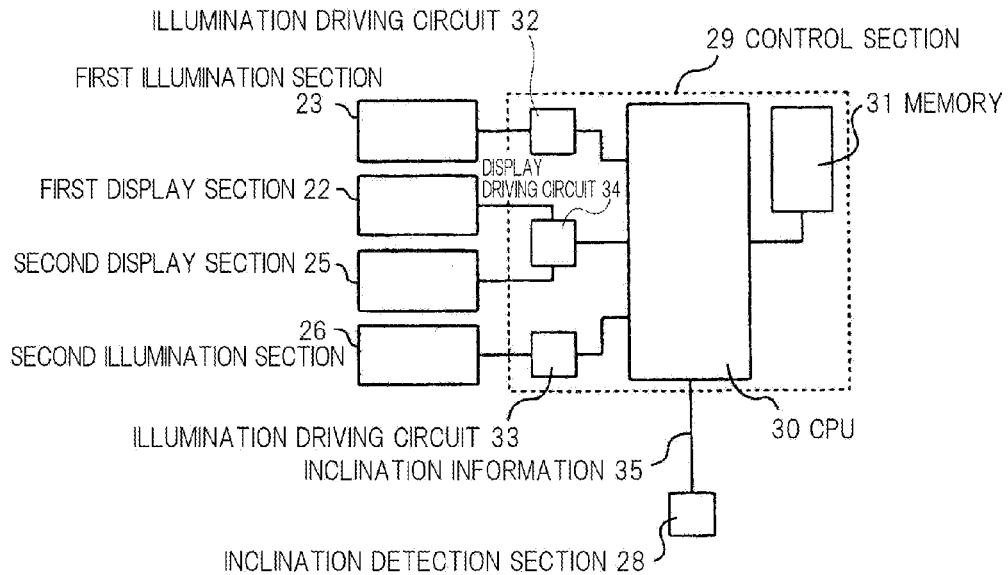
FIG. 4 is a functional block diagram showing the configuration of the mobile communication apparatus according to the first example.

FIGS. 3A and 3B are diagrams showing a full view and a state of use of the mobile communication apparatus according to the first example. FIG. 4 is a functional block diagram showing the configuration of the mobile communication apparatus according to the first example.

Referring to FIG. 3A or 3B, mobile communication apparatus 20 according to the first example has first case 21 and second case 24. First case 21 and second case 24 are openably and closably connected via hinge section 27. First case 21 is implemented with first display section 22, first illumination section 23 and inclination detection section 28. Second case 24 is implemented with second display section 25 and second illumination section 26.

Referring to FIG. 4, mobile communication apparatus 20 further has control section 29. Control section 29 includes CPU (Central Processing Unit) 30, memory 31, illumination driving circuits 32 and 33, and display driving circuit 34.

Each of first display section 22 and second display section 25 has a display screen, and it is driven by display driving circuit 34 and displays an image on the screen.

First illumination section 23 is driven by illumination driving circuit 32 and illuminates first display section 22. Second illumination section 26 is driven by illumination driving circuit 33 and illuminates second display section 25.

Inclination detection section 28 detects the inclination of first case 21 relative to the gravity direction and notifies CPU 30 of control section 29 of inclination information that indicates the detected inclination.

In response to an instruction from CPU 30, display driving circuit 34 drives first display section 22 and second display section 25 to display an image.

In response to an instruction from CPU 30, illumination driving circuit 32 drives first illumination section 23. In response to an instruction from CPU 30, illumination driving circuit 33 drives second illumination section 26.

CPU 30 controls each section by executing a program using memory 31. The program executed by CPU 30 may be stored in memory 31.

An operation of mobile communication apparatus 20 will be described below which each of the above sections operates in conjunction with.

When first case 21 and second case 24 which are mutually combined via hinge section 27 are in an open state of a turning open/close operation, first case 21 and second case 24 keep a relative opening angle θa.

FIG. 3A shows that first case 21 is in a horizontal state. FIG. 3B shows that second case 24 is in a horizontal state. When second case 24 is in the horizontal state, inclination detection section 28 detects that first case 21 inclines at an angle of "180−θa" relative to the horizontality.

When the user reads information such as characters displayed on first display section 22 and second display section 25 by using mobile communication apparatus 20, he attempts to look straight at the display section on which the information he is reading is displayed. In the case of looking straight at the display in a standing or sitting position, he generally holds the display section he is reading, horizontally. Therefore, there is a high possibility that the user's line of sight is directed to the display section whose display screen is horizontally positioned. If the angle indicated by inclination information 35 is within a predetermined threshold range relative to a horizontal direction, with 0° as the center, CPU 30 determines that the user's line of sight is directed to first display section 22. If the angle indicated by inclination information 35 is within a predetermined threshold range relative to a horizontal direction, with (180−θa)° as the center, CPU 30 determines that the user's line of sight is directed to second display section 25.

Then, CPU 30 instructs illumination driving circuit 32 or illumination driving circuit 33 to switch off the light of the illumination section illuminating the display section to which the user's line of sight is not directed. Specifically, when the user's line of sight is directed to first display section 22, CPU 30 instructs illumination driving circuit 33 to switch off the light of second illumination section 26. When the user's line of sight is directed to second display section 25, CPU 30 instructs illumination driving circuit 32 to switch off the light of first illumination section 23.

Figure 5:
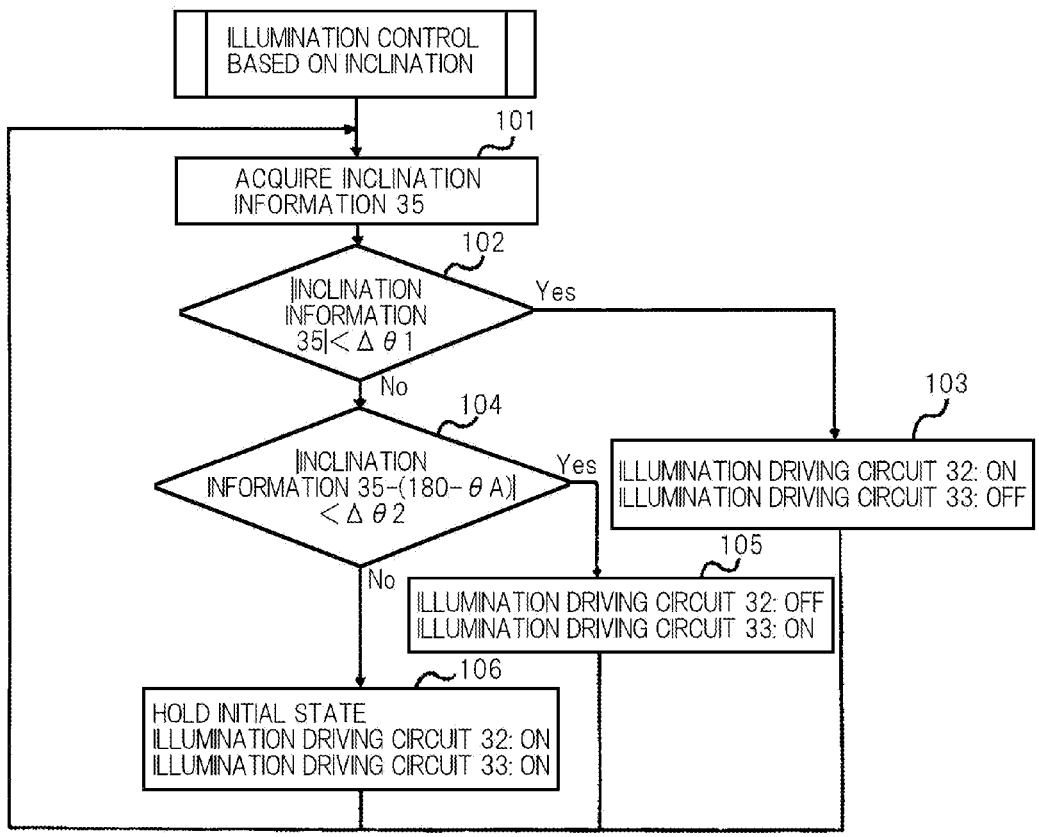
FIG. 5 is a flowchart showing an operation of controlling illumination to first display section 22 and second display section 25 in mobile communication apparatus 20 according to the first example.

FIG. 5 is a flowchart showing an operation of controlling illumination to first display section 22 and second display section 25 in mobile communication apparatus 20 according to the first example.

Here, it is assumed that both illumination driving circuit 32 and illumination driving circuit 33 are switched on as the initial state. That is, it is assumed that first display section 22 is being illuminated by first illumination section 23, and second display section 25 is being illuminated by second illumination section 26.

Referring to FIG. 5, when inclination detection section 28 detects an inclination and sends inclination information 35 to CPU 30 first (step 101), CPU 30 determines, with an angle indicated by inclination information 35 as the input, whether or not the absolute value of the angle is smaller than threshold Δθ1 (step 102). If the absolute value of the angle is smaller than the threshold Δθ1, CPU 30 determines that mobile communication apparatus 20 is held such that first case 21 is horizontally positioned, and CPU 30 switches on illumination driving circuit 32 which drives first illumination section 23 and switches off illumination driving circuit 33 which drives second illumination section 26 (step 103). Then, CPU 30 returns to step 101.

If the absolute value of the angle indicated by inclination information 35 is not smaller than the threshold Δθ1, CPU 30 then determines whether or not (the angle indicated by inclination information 35)-(180−θa) is smaller than a threshold Δθ2 (step 104). If (the angle indicated by inclination information 35)-(180−θa) is smaller than threshold Δθ2, CPU 30 determines that mobile communication apparatus 20 is held such that second case 24 is horizontally positioned, and CPU 30 switches off illumination driving circuit 32 which drives first illumination section 23 and switches on illumination driving circuit 33 which drives second illumination section 26 (step 105). Then, CPU 30 returns to step 101.

If (the angle indicated by inclination information 35)−(180−θa) is not smaller than threshold Δθ2, CPU 30 cannot determine the display section to which the viewer's line of sight is directed, and therefore, CPU 30 switches on both illumination driving circuit 32 which drives first illumination section 23 and illumination driving circuit 33 which drives second illumination section 26 (step 106). Then, CPU 30 returns to step 101.

In this example, the display screen of the display section which the user is viewing is determined by the screen that is horizontally positioned between the screens of the two display sections. The present invention, however, is not limited to the case of using the horizontal plane as the reference for determination. By specifying some reference plane, whichever display section that has a screen inclination from the reference plane that is smaller than a threshold can be determined to be the display section which the user is viewing. The reference plane can be changed according to the position of the user such as a position of lying face-up or on his side. For example, the user may perform a predetermined initial operation for specifying the reference plane. As an example of an initial operation, it is conceivable that an operation for setting a reference plane is performed while mobile communication apparatus 20 is held at an angle the user wants to set as a reference.

Second Exemplary Embodiment

In the mobile communication apparatus according to the first exemplary embodiment, two screens form an angle smaller than 180°, and it is determined that the user's line of sight is directed to a display section held with an inclination closer to the reference horizontal plane. In comparison, in a mobile communication apparatus according to a second exemplary embodiment, the display surface that the user is viewing is determined on the basis of temporal change in the detected inclination. In this exemplary embodiment, even if two screens are arranged such that they form 180°, the display screen the user is viewing can be determined from the user's natural action.

The basic configuration and structure of the mobile communication apparatus of the second exemplary embodiment are similar to those of the first exemplary embodiment shown in FIGS. 1 and 2. Similar to the mobile communication apparatus of the first exemplary embodiment, the mobile communication apparatus according to the second exemplary embodiment has two displays 11 and 12, inclination detection section 13 and control section 15. Display 11 is implemented in case 16, and display 12 is implemented in case 17. Cases 16 and 17 are openably and closably connected via a hinge. In the second exemplary embodiment, however, the angle formed by the display surfaces of cases 16 and 17 in an open state is not limited to an angle smaller than 180°. Cases 16 and 17 can be opened such that an angle of 180° is formed.

In the case of looking at display 11 arranged on the left in FIG. 2, the user performs an action of turning mobile communication apparatus 10 counterclockwise once and then turning it clockwise. In the case of looking at display 12 arranged on the right in FIG. 2, the user performs an action of once turning mobile communication apparatus 10 clockwise and then turning it counterclockwise.

Displays 11 and 12 and inclination detection section 13 in the second exemplary embodiment are similar to those of the first exemplary embodiment.

Control section 15 in the second exemplary embodiment determines the display surface that the user is viewing on the basis of temporal change in the inclination detected by inclination detection section 13. As an example, if mobile communication apparatus 10 turns counterclockwise to the case 16 side and then turns clockwise to the case 17 side, control section 15 determines that the user is viewing display 11 implemented in case 16. It is the same as the first exemplary embodiment that, control section 15 next adjusts the display, determined as being viewed at by the user, to have an appropriate brightness, and switches off the light of the other display.

As described above, according to this exemplary embodiment, even if the display surfaces of two cases 16 and 17 are open at an angle of 180°, mobile communication apparatus 10 determines the screen that the user is viewing at and adjusts illumination to the screen, only when the user carries out an ordinary operation. Therefore, it is possible to reduce power consumption of the screen that the user is not viewing at while ensuring that the screen which the user is viewing is viewable.

Control section 15 shown here as an example determines a turn direction indicated by temporal change in an inclination, from inclination information obtained from inclination detection section 13 and uses it for making a determination. It is, however, also conceivable that inclination detection section 13 will detects triaxial acceleration and sends it to control section 15, and that control section 15 will determines a turn direction from the acceleration.

Second Example

A more specific example of the second exemplary embodiment will be shown as a second example. Here, an example is shown in which a section corresponding to open/close detection section 14 is not provided.

Figure 6A:
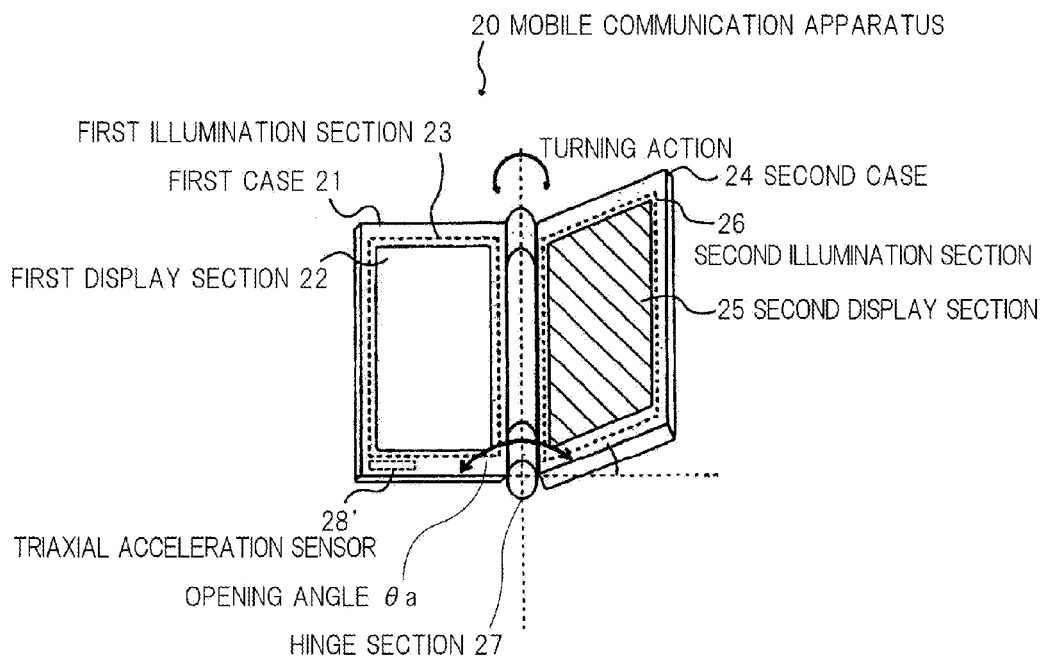
FIG. 6A is a diagram showing a full view and a state of use of a mobile communication apparatus according to a second example.
Figure 6B:
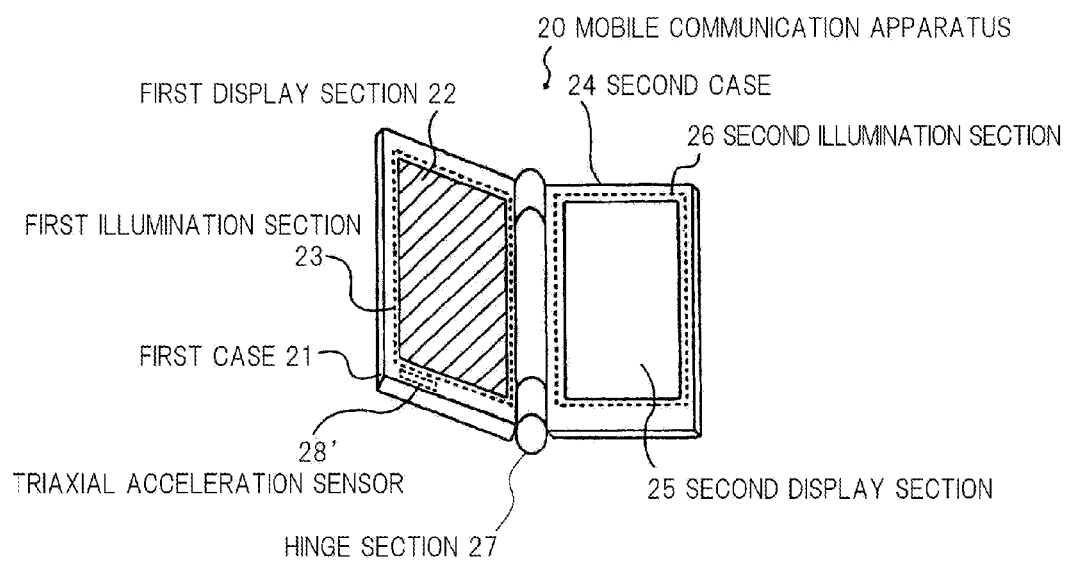
FIG. 6B is a diagram showing a full view and a state of use of the mobile communication apparatus according to the second example.
Figure 7:
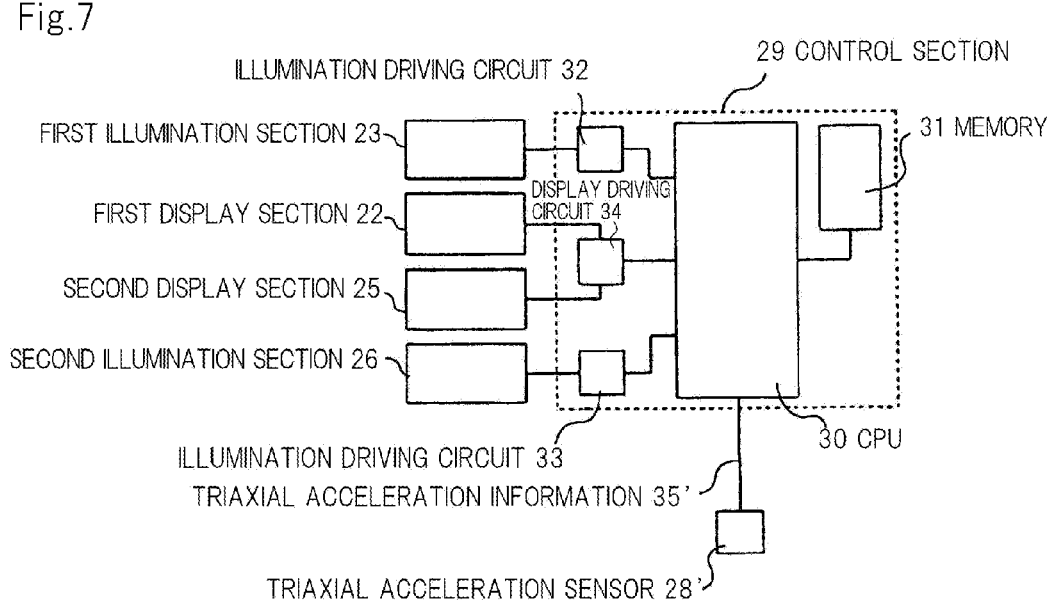
FIG. 7 is a functional block diagram showing the configuration of the mobile communication apparatus according to the second example.

FIGS. 6A and 6B are diagrams showing a full view and the state of use of the mobile communication apparatus according to the second example. FIG. 7 is a functional block diagram showing the configuration of the mobile communication apparatus according to the second example.

The basic full view and configuration of mobile communication apparatus 20 of the second example shown in FIGS. 6A, 6B and 7 are similar to those of the first example shown in FIGS. 3A, 3B and 7. Mobile communication apparatus 20 of the second example, however, is provided with triaxial acceleration sensor 28' as an inclination detection section.

Information used for determination of the display section that the user is viewing is the turning action of mobile communication apparatus 20 with hinge section 27 connecting first case 21 and second case 24 as an axis. Here, the clockwise direction and the counterclockwise direction are defined as a positive direction and a negative direction, respectively, for convenience' sake.

In this example, in the case of reading information displayed on first display section 22 or second display section 25 using mobile communication apparatus 20, the user performs a series of actions of turning mobile communication apparatus 20 in any of the positive and negative directions with hinge section 27 as the central axis and, after that, turning mobile communication apparatus 20 in the opposite direction.

Triaxial acceleration sensor 28' measures not only information indicating an inclination relative to the direction of gravitational acceleration but also triaxial acceleration caused by movement and turning motion of mobile communication apparatus 20, and notifies CPU 30 of control section 29 of triaxial acceleration information 35'. Temporal change in the inclination can be obtained from the triaxial acceleration.

When the user performs the series of actions described above, triaxial acceleration sensor 28' detects a turning motion by the series of actions and notifies CPU 30 thereof as triaxial acceleration information 35'.

CPU 30 determines the display surface of the display section the user is viewing based on the basis of the temporal change in the inclination obtained from triaxial acceleration information 35' which has been notified from triaxial acceleration sensor 28'.

Then, CPU 30 instructs illumination driving circuit 32 or illumination driving circuit 33 to switch off the light of illumination section illuminating the display section to which the user's line of sight is not directed, similarly to the first example.

Figure 8:
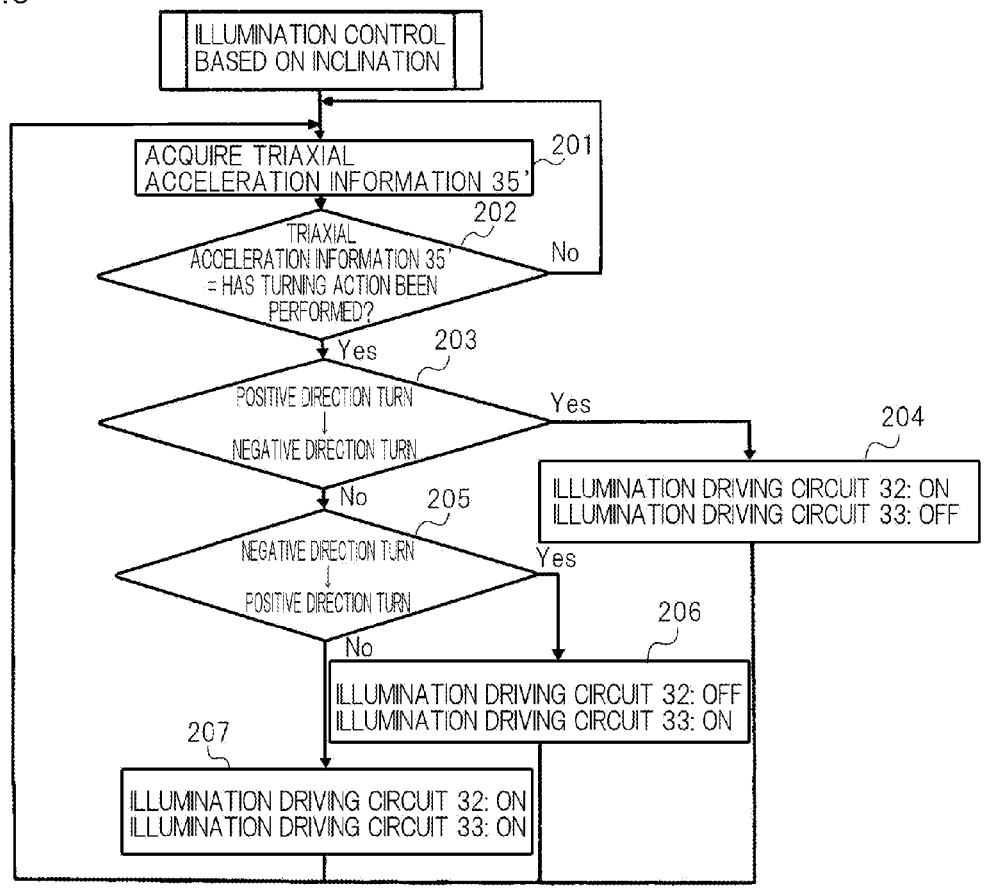
FIG. 8 is a flowchart showing an operation of controlling illumination to first display section 22 and second display section 25 in mobile communication apparatus 20 according to the second example.

FIG. 8 is a flowchart showing an operation of controlling illumination to first display section 22 and second display section 25 in mobile communication apparatus 20 according to the second example. Here, it is assumed that both illumination driving circuit 32 and illumination driving circuit 33 are switched on as the initial state. That is, it is assumed that first display section 22 is being illuminated by first illumination section 23, and second display section 25 is being illuminated by second illumination section 26.

Referring to FIG. 8, triaxial acceleration sensor 28' detects triaxial acceleration and notifies CPU 30 of triaxial acceleration information 35' first (step 201). CPU 30 determines whether a turning action has been performed or not on the basis of triaxial acceleration information 35' (step 202). If a turning action has not been performed, CPU 30 returns to step 201.

If a turning action has been performed, CPU 30 determines whether or not the turning action has been performed in the positive direction and then in the negative direction (step 203).

If the turning action has been performed in the positive direction and then in the negative direction, CPU 30 switches on illumination driving circuit 32 which drives first illumination section 23 and switches off illumination driving circuit 33 which drives second illumination section 26 (step 204) and returns to step 201.

If the turning action has not been performed in the positive direction and then in the negative direction, CPU 30 determines whether or not the turning action has been performed in the negative direction and then in the positive direction (step 205).

If the turning action has been performed in the negative direction and then in the positive direction, CPU 30 switches off illumination driving circuit 32 which drives first illumination section 23 and switches on illumination driving circuit 33 which drives second illumination section 26 (step 206) and returns to step 201.

If the turning action has not been performed in the negative direction and then in the positive direction, CPU 30 switches on illumination driving circuit 32 which drives first illumination section 23 and switches on illumination driving circuit 33 which drives second illumination section 26 (step 207) and returns to step 201.

In the second example, an example has been shown in which illumination driving circuits 32 and 33 are switched on or off. The present invention, however, is not limited thereto. As another example, the brightness of illumination driving circuits 32 and 33 may be changed instead of switching on/off illumination driving circuits 32 and 33. In this case as well, the advantage of reducing power consumption can be obtained.

In the second example, an example has been shown in which CPU 30 switches on both illumination driving circuits 32 and 33 at step 207 in FIG. 8. The present invention, however, is not limited thereto. As another example, CPU 30 may maintain the state of illumination driving circuits 32 and 33 at that time.

In the second example, the display section which the user is viewing is determined based on the basis of temporal change in an inclination, irrespective of the relative angle between first case 21 and second case 24. The present invention, however, is not limited thereto. As another example, it is also possible to use both of the determination methods in the first and second examples and to use any of the methods according to the relative angle between first case 21 and second case 24.

Specifically, an open/close detection section (not shown) can be provided for mobile communication apparatus 20. When first case 21 and second case 24 are open, the open/close detection section detects whether the two cases are open at a relative angle of 180° or at a relative angle smaller than 180°. When first case 21 and second case 24 are open at a relative angle smaller than 180°, CPU 30 determines the display surface of the display section the user is viewing based on the basis of the apparatus orientation (inclination) as in the first example. When first case 21 and second case 24 are open at a relative angle of 180°, CPU 30 determines the display surface that the user is viewing at on the basis of temporal change in the apparatus orientation (turn).

Thereby, it is possible to determine the display screen of the display section the user is viewing only from the inclination of mobile communication apparatus 20 without the user performing any operation, when the two cases are open at a relative angle that is smaller than 180°, and to determine the display screen of the display section that the user is viewing only from the inclination of mobile communication apparatus 20 only by the user performing a natural action, when the two cases are open at an angle of 180°. As a result, it is possible to realize both screen viewability and a reduction in power consumption while reducing the operation burden on the user in mobile communication apparatus 20 in which the two cases can open at a relative angle smaller than 180° and can open at 180°.

In the first and second exemplary embodiments, in which it is determined that the user's line of sight is directed towards the display surface of the display section based on the basis of an inclination detected by inclination detection section 13 shown in FIG. 1. In the present invention, however, the method of determining the direction of the user's line of sight is not limited thereto. As another example, the display surface of the display to which the user's line of sight is directed may be determined on the basis of an image taken by a camera.

Third Exemplary Embodiment

A mobile communication apparatus according to a third exemplary embodiment determines the display surface of the display to which the user's line of sight is directed on the basis of an image taken by a camera and controls display brightness of each display according to a result of the determination.

Figure 9:
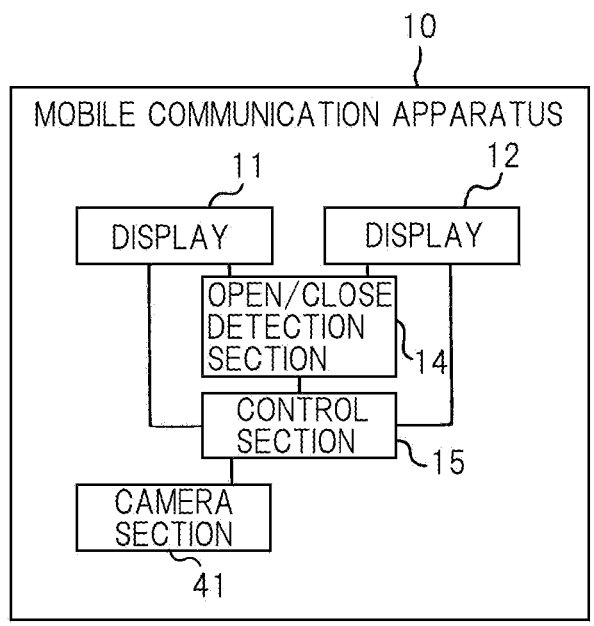
FIG. 9 is a functional block diagram showing a schematic configuration of a mobile communication apparatus according to a third exemplary embodiment.
Figure 10:
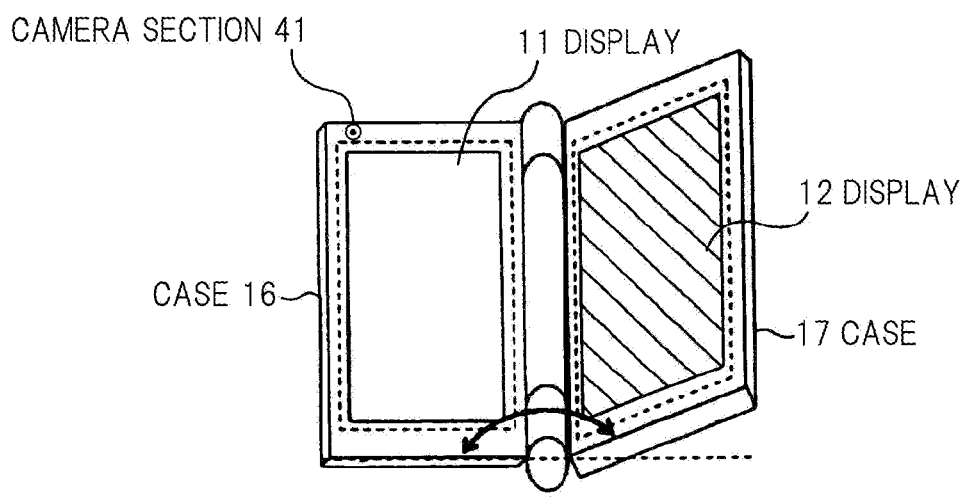
FIG. 10 is a full-view diagram showing a schematic structure of the mobile communication apparatus according to the third exemplary embodiment.

FIG. 9 is a functional block diagram showing a schematic configuration of the mobile communication apparatus according to the third exemplary embodiment. FIG. 10 is a full view showing a schematic structure of the mobile communication apparatus according to the third exemplary embodiment.

Referring to FIG. 9, mobile communication apparatus 10 has two displays 11 and 12, camera section 41 and control section 15. Mobile communication apparatus 10 may further have open/close detection section 14.

As shown in FIG. 10, displays 11 and 12 have display surfaces arranged side by side so that a user can view them switching his line of sight from one screen to the other. As an example, two displays 11 and 12 are implemented in two cases 16 and 17, respectively, being openably and closably connected with each other by a hinge such that the display surfaces face each other when two cases 16 and 17 are closed. It is assumed that it is possible to open two cases 16 and 17 such that the two display surfaces form a relative angle smaller than 180 degrees and to maintain the state, like an example shown in FIG. 2. The user may use mobile communication apparatus 10 in a state in which two cases 16 and 17 are opened such that the two display surfaces are vertically arranged or in a state in which the two display surfaces are horizontally arranged.

Camera section 41 takes an image in front of any one of two displays 11 and 12. As shown in the example shown in FIG. 10, camera section 41 is implemented in case 16 or in case 17, and it takes an image in front of the display surface of the display implemented in the same case.

Control section 15 determines the display surface of the display to which the user's line of sight is directed on the basis of image-taking information about the image taken by camera section 41, and causes a display surface on a display, other than the display surface determined as being the display surface to which the user's line of sight is directed, to become darker than the display surface on the display determined as being the display surface to which the user's line of sight is directed.

As an example, if, in this case, the image taken by camera section 41 is an image showing that the user is facing straight toward the camera section 41 (a front image), control section 15 determines that the user is looking at the display surface of the display section implemented in the same case as camera section 41. If the image taken by camera section 41 shows an oblique image of the user facing to a case in which camera section 41 is not implemented (an oblique image), control section 15 determines that the user is looking at the display surface of the display section implemented in the case that is different from the case including camera section 41.

As an example, control section 15 causes the display determined to be the display to which the line of sight is directed, to have an appropriate brightness and switches off the light of the other display.

Open/close detection section 14 determines whether two cases 16 and 17 are open or closed. In this case, control section 15 control section 15 determines the display surface to which the user's line of sight is directly only when two cases 16 and 17 are in an open state, and switches off the light of the display other than the display to which the line of sight is directed.

In this exemplary embodiment, mobile communication apparatus 10 distinguishes between a front image and an oblique image by image processing. It is also possible to take an image of the user and to store it when the user carries out an initial operation. Mobile communication apparatus 10 can distinguish between a front image and an oblique image by comparing an image taken when the user uses mobile communication apparatus 10 with the stored image. Thereby, the distinction accuracy is improved.

In this exemplary embodiment, it is also possible for images to be intermittently taken instead of having camera section 41 continuously take a motion picture in order to reduce power consumed by camera section 41 and the like.

As described above, according to this exemplary embodiment, the display surface to which the user's line of sight is directed is determined on the basis of image-taking information as regards an image detected by camera section 41, and the display surface of the display section, other than the display surface determined as the display surface to which the user's line of sight is directed, is darkened. Therefore, it is possible to reduce power consumption of the screen which the user is not viewing at while ensuring that the screen which the user is viewing is viewable.

Third Example

A more specific example of the third exemplary embodiment will be shown as a third example. Here, an example is shown in which a section corresponding to open/close detection section 14 is not provided.

Figure 11A:
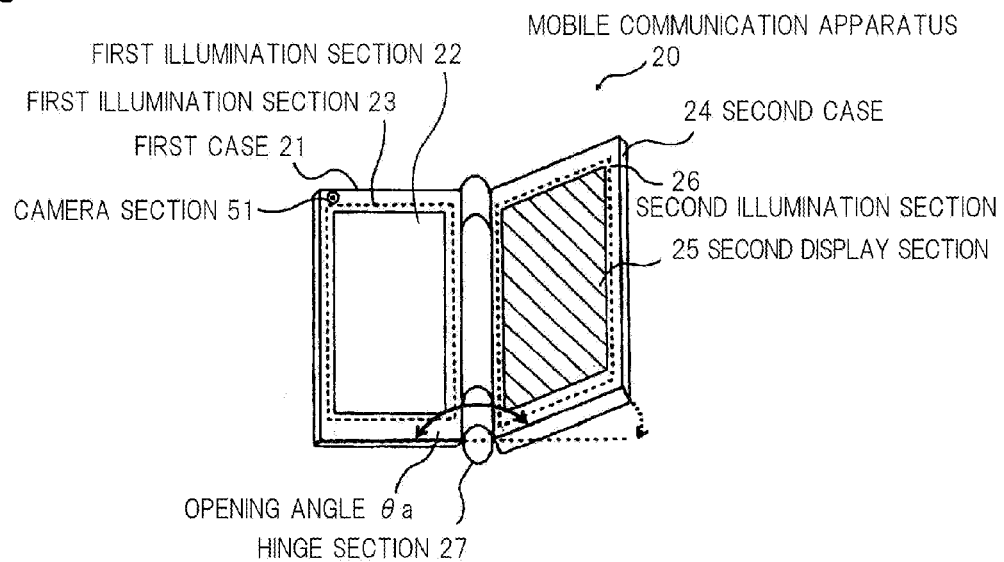
FIG. 11A is a diagram showing a full view and a state of use of the mobile communication apparatus according to a third example.
Figure 11B:
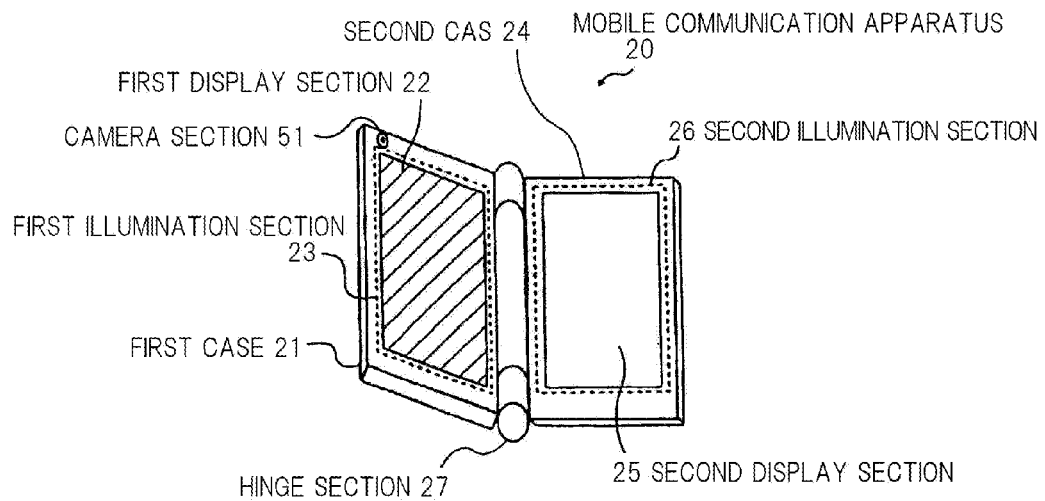
FIG. 11B is a diagram showing a full view and a state of use of the mobile communication apparatus according to the third example.
Figure 12:
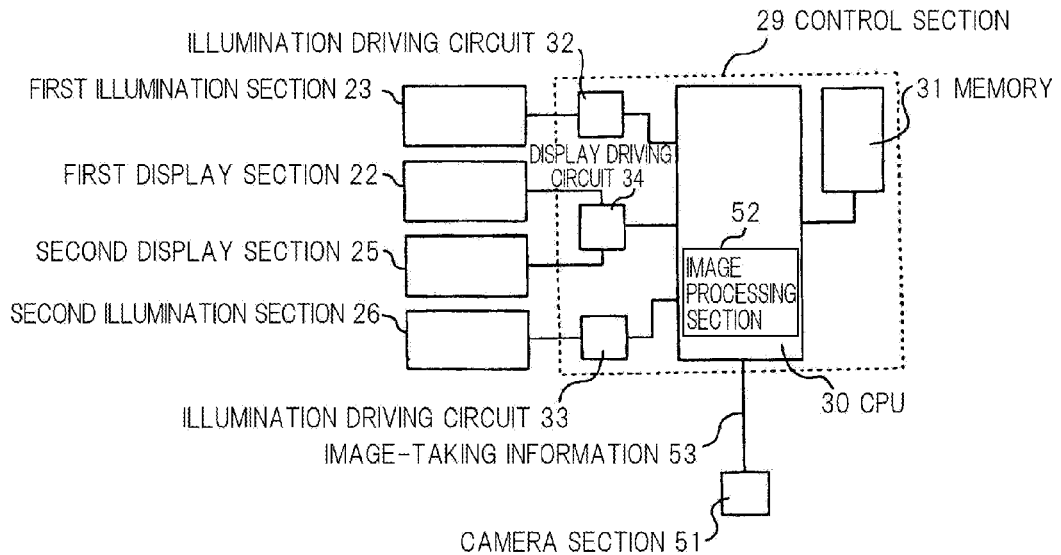
FIG. 12 is a functional block diagram showing the configuration of the mobile communication apparatus according to the third example.

FIGS. 11A and 11B are diagrams showing a full view and a state of use of the mobile communication apparatus according to the third example. FIG. 12 is a functional block diagram showing the configuration of the mobile communication apparatus according to the third example.

Referring to FIG. 11A or 11B, mobile communication apparatus 20 according to the third example has first case 21 and second case 24. First case 21 and second case 24 are openably and closably connected via hinge section 27. First case 21 is implemented with first display section 22, first illumination section 23 and camera section 51. Second case 24 is implemented with second display section 25 and second illumination section 26.

Referring to FIG. 12, mobile communication apparatus 20 further has control section 29. Control section 29 includes CPU (Central Processing Unit) 30, memory 31, illumination driving circuits 32 and 33, and display driving circuit 34. CPU 30 includes image processing section 52.

Each of first display section 22 and second display section 25 has a display screen, and it is driven by display driving circuit 34 and displays an image on the screen.

First illumination section 23 is driven by illumination driving circuit 32 and illuminates first display section 22. Second illumination section 26 is driven by illumination driving circuit 33 and illuminates second display section 25.

Camera section 51 takes an image in front of first case 21 and notifies CPU 30 of control section 29 of image-taking information 53 which is image data of the image.

In response to an instruction from CPU 30, display driving circuit 34 drives first display section 22 and second display section 25 to display an image.

In response to an instruction from CPU 30, illumination driving circuit 32 drives first illumination section 23. In response to an instruction from CPU 30, illumination driving circuit 33 drives second illumination section 26.

CPU 30 controls each section by executing a program using memory 31. The program executed by CPU 30 may be stored in memory 31.

An operation of mobile communication apparatus 20 will be described below which each of the above sections operates in conjunction with.

When first case 21 and second case 24, which are mutually combined via hinge section 27, are in an open state of a turning open/close operation, first case 21 and second case 24 maintain a relative opening angle θa.

FIG. 11A shows that first case 21 is in a horizontal state. FIG. 11B shows that second case 24 is in a horizontal state. It is assumed here that the case in the horizontal state is directly facing the user. Therefore, first case 21 directly faces the user in the state shown in FIG. 11A, and second case 24 faces straight toward the user in the state shown in FIG. 11B. An image taken by camera section 51 in the state shown in FIG. 11A is a front image, and an image taken by camera section 51 in the state shown in FIG. 11B is an oblique image.

When the user reads information such as characters displayed on first display section 22 and second display section 25 using mobile communication apparatus 20, he attempts to look directly at the display section on which the information he is reading is displayed. Therefore, if an image taken by camera section 51 is a front image as a result of image processing by image processing section 52, CPU 30 determines that the user's line of sight is directed to first display section 22. If an image taken by camera section 51 is an oblique image, CPU 30 determines that the user's line of sight is directed to second display section 25.

Then, CPU 30 instructs illumination driving circuit 32 or illumination driving circuit 33 to switch off the light of the illumination section illuminating the display section to which the user's line of sight is not directed. Specifically, when the user's line of sight is directed to first display section 22, CPU 30 instructs illumination driving circuit 33 to switch off the light of second illumination section 26. When the user's line of sight is directed to second display section 25, CPU 30 instructs illumination driving circuit 32 to switch off the light of first illumination section 23.

Figure 13:
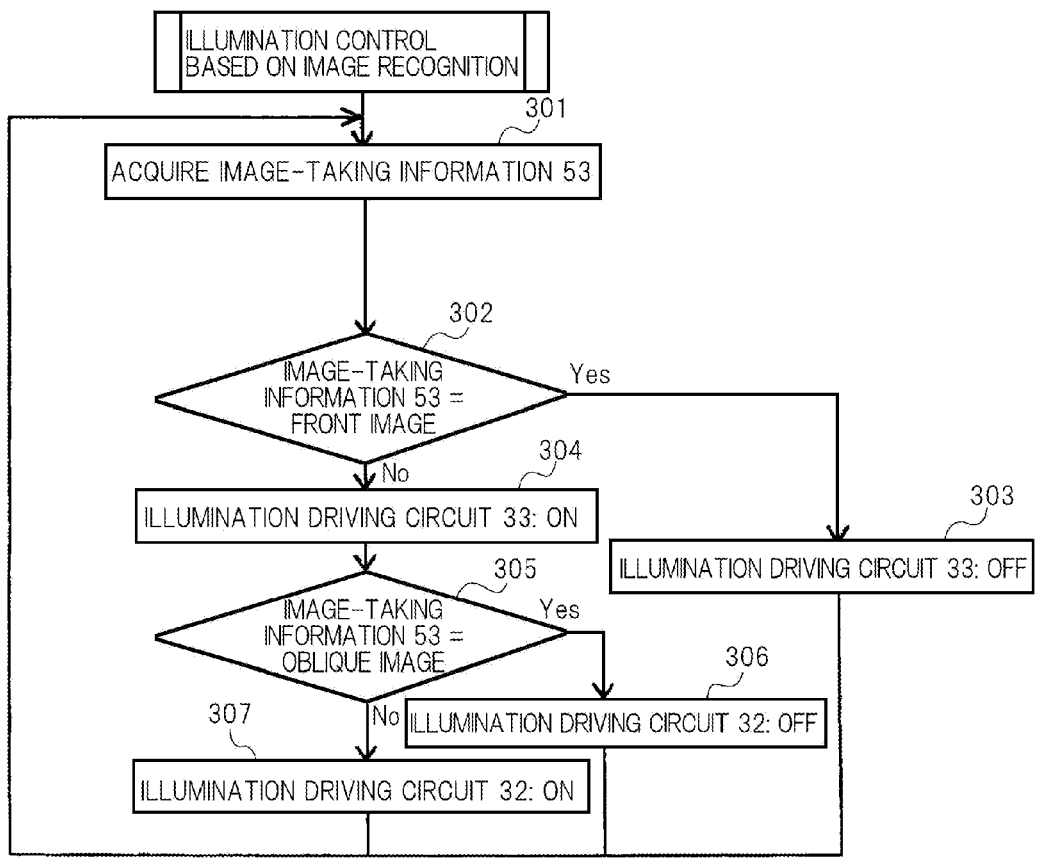
FIG. 13 is a flowchart showing an operation of controlling illumination to first display section 22 and second display section 25 in mobile communication apparatus 20 according to the third example.

FIG. 13 is a flowchart showing an operation of controlling illumination to first display section 22 and second display section 25 in mobile communication apparatus 20 according to the third example.

Here, it is assumed that both illumination driving circuit 32 and illumination driving circuit 33 are switched on as the initial state. That is, it is assumed that first display section 22 is being illuminated by first illumination section 23, and second display section 25 is being illuminated by second illumination section 26.

Referring to FIG. 13, when camera section 51 takes an image and sends image-taking information 53 to CPU 30 first (step 301), CPU 30 performs image processing of image-taking information 53 and determines whether or not the image taken by camera section 51 is a front image (step 302).

If the image taken by camera section 51 is a front image, CPU 30 switches off illumination driving circuit 33 which drives second illumination section 26 (step 303) and returns to step 301.

If the image taken by camera section 51 is not a front image, CPU 30 switches on illumination driving circuit 33 which drives second illumination section 26 (step 304). Then, CPU 30 determines whether or not the image taken by the camera section 51 is an oblique image in which the user faces second display section 25, from the result of the image processing by image-taking information 53 (step 305).

If the image taken by camera section 51 is an oblique image in which the user faces second display section 25, CPU 30 switches off illumination driving circuit 32 which drives first illumination section 23 (step 306), and returns to step 301. If the image taken by camera section 51 is not an oblique image in which the user faces second display section 25, CPU 30 switches on illumination driving circuit 32 which drives first illumination section 23 (step 307), and returns to step 301.

Fourth Exemplary Embodiment

In the third exemplary embodiment, the display screen to which the user's line of sight is directed to is determined on the basis of whether an image taken by camera section 41 is a front image or an oblique image. The method of determining the direction of the user's line of sight on the basis of an image taken by camera section 41 is not limited thereto. In the fourth exemplary embodiment, a mobile communication apparatus is shown which determines the direction of the user's line of sight on the basis of change in an image taken by camera section 41.

The basic configuration and structure of mobile communication apparatus 10 according to the fourth exemplary embodiment are similar to those shown in FIGS. 9 and 10. In mobile communication apparatus 10 shown in FIG. 10, the user turns mobile communication apparatus 10 when shifting from a state of looking directly at one display to a state of looking directly at the other display. Mobile communication apparatus 10 of the fourth exemplary embodiment detects a turning operation of mobile communication apparatus 10 from a change in the image taken by camera section 41 and determines the direction of the user's line of sight from the direction of the turn.

Similar to the mobile communication apparatus of the third exemplary embodiment shown in FIG. 9, the mobile communication apparatus according to the fourth exemplary embodiment has two displays 11 and 12, camera section 41 and control section 15. Referring to FIG. 10, display 11 is implemented in case 16, and display 12 is implemented in case 17. Cases 16 and 17 are openably and closably connected via a hinge.

Displays 11 and 12 and camera section 41 in the fourth exemplary embodiment are similar to those of the first exemplary embodiment.

Control section 15 in the fourth exemplary embodiment determines the display surface that the user is viewing at on the basis of temporal change in the image taken by camera section 41. The temporal change in the image appears as blur of the image. As an example, control section 15 determines that the user is looking at display 11 implemented in case 16 if mobile communication apparatus 10 turns counterclockwise to case 16. The turn direction of mobile communication apparatus 10 appears as the blur direction of the image. It is the same as the third exemplary embodiment that, control section 15 next adjusts the display surface determined as being viewed at by the user, to have an appropriate brightness, and switches off the light of the other display.

As described above, according to this exemplary embodiment, mobile communication apparatus 10 can determine the screen that the user is viewing and adjust illumination to the screen without determining whether an image taken by camera section 41 is a front image or an oblique image.

Fourth Example

A more specific example of the fourth exemplary embodiment will be shown as a fourth example. Here, an example is shown in which a section corresponding to open/close detection section 14 is not provided.

Figure 14A:
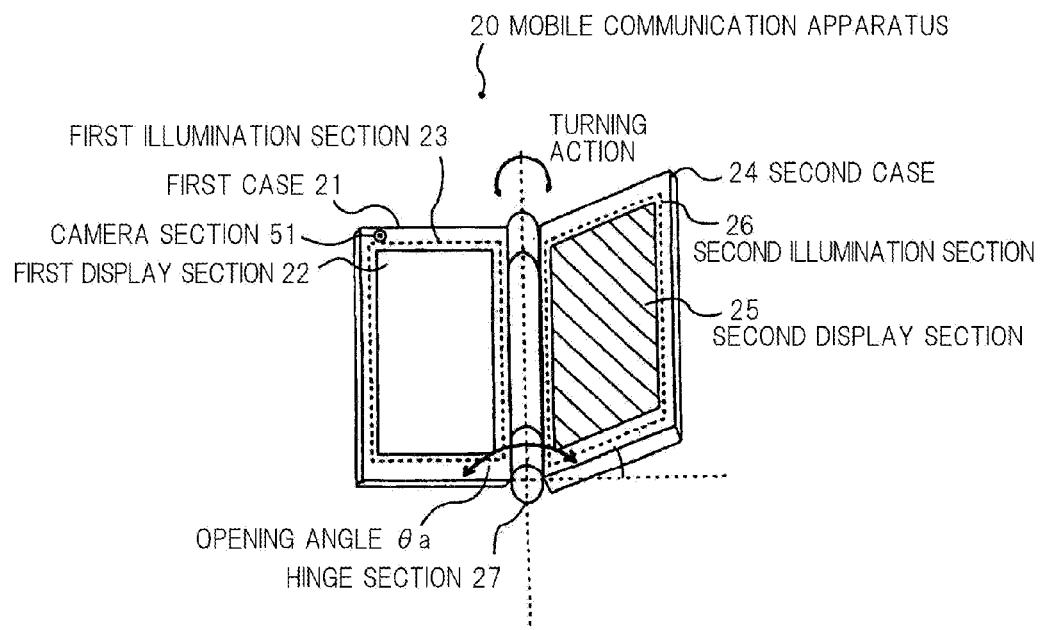
FIG. 14A is a diagram showing a full view and a state of use of a mobile communication apparatus according to a fourth example.
Figure 14A:
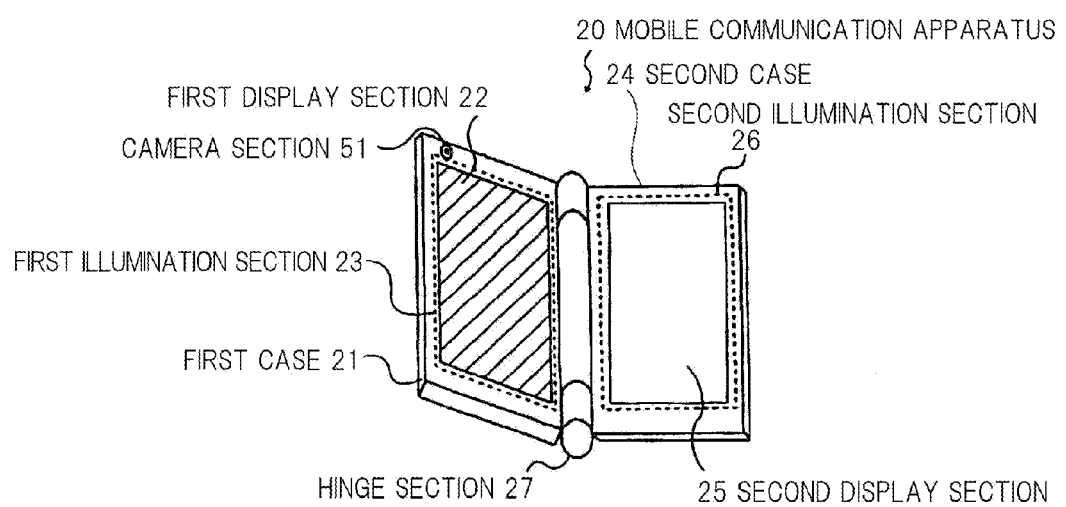

FIGS. 14A and 14B are diagrams showing a full view and a state of use of the mobile communication apparatus according to the fourth example. The configuration of the mobile communication apparatus according to the fourth example is the same as that of the third example shown in FIG. 12.

Information that is used to determine the display section which the user is viewing is the turning operation of mobile communication apparatus 20 with hinge section 27 connecting first case 21 and second case 24 as an axis. Here, the clockwise direction and the counterclockwise direction are defined as a positive direction and a negative direction, respectively, for convenience' sake.

In the case of reading information displayed on first display section 22 or second display section 25 using mobile communication apparatus 20, the user turns mobile communication apparatus 20 in the positive direction by an angle of about (180−θa)° when shifting his line of sight from first display section 22 to second display section 25. The user turns mobile communication apparatus 20 in the negative direction by an angle of about (180−θa)° when shifting his line of sight from second display section 25 to first display section 22. The inclination of mobile communication apparatus 20 changes due to such a turn, and the image taken by camera section 51 blurs.

CPU 30 determines the display surface of the display section the user is viewing based on the basis of temporal change in an inclination obtained from image-taking information notified from camera section 51.

Then, CPU 30 instructs illumination driving circuit 32 or illumination driving circuit 33 to switch off the light of illumination section illuminating the display section to which the user's line of sight is not directed, similarly to the first example.

Figure 15:
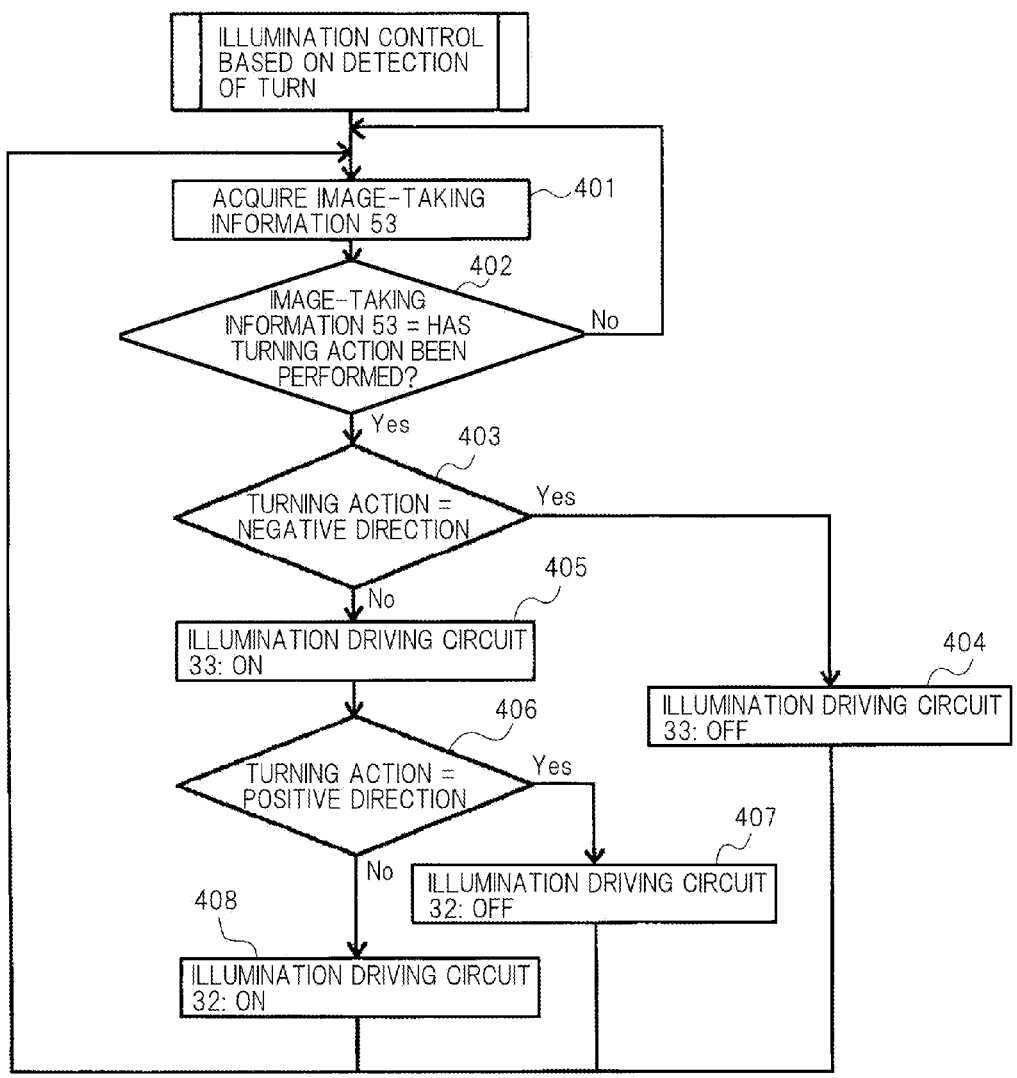
FIG. 15 is a flowchart showing an operation of controlling illumination to first display section 22 and second display section 25 in mobile communication apparatus 20 according to the fourth example.

FIG. 15 is a flowchart showing an operation of controlling illumination to first display section 22 and second display section 25 in the mobile communication apparatus 20 according to the fourth example. Here, it is assumed that both illumination driving circuit 32 and illumination driving circuit 33 are switched on as the initial state. That is, it is assumed that first display section 22 is being illuminated by first illumination section 23, and second display section 25 is being illuminated by second illumination section 26.

Referring to FIG. 15, camera section 51 takes an image and notifies CPU 30 of image-taking information 53 first (step 401). CPU 30 performs image processing of image-taking information 53 and determines whether or not a turning action has been performed (step 402). If a turning action has not been performed, CPU 30 returns to step 401.

If a turning action has been performed, CPU 30 determines whether or not the turning action has been performed in the negative direction (step 403). If the turning action has been performed in the negative direction, CPU 30 switches off illumination driving circuit 33 which drives second illumination section 26 (step 404) and returns to step 401.

If the turning action has not been performed in the negative direction, CPU 30 switches on illumination driving circuit 33 which drives second illumination section 26 (step 405). Then, CPU 30 determines whether or not the turning action has been performed in the positive direction (step 406).

If the turning action has been performed in the positive direction, CPU 30 switches off illumination driving circuit 32 which drives first illumination section 23 (step 407) and returns to step 401.

If the turning action has not been performed in the positive direction, CPU 30 switches on illumination driving circuit 32 which drives first illumination section 23 (step 408) and returns to step 401.

In the fourth example, an example has been shown in which illumination driving circuits 32 and 33 are switched on or off. The present invention, however, is not limited thereto. As another example, the brightness of illumination driving circuits 32 and 33 may be changed instead of switching illumination driving circuits 32 and 33 on/off. In this case, as well, the advantage of reducing power consumption can be obtained.

Usually, the user turns mobile communication apparatus 20 to face directly toward any of the display sections of mobile communication apparatus 20. It is, however, also conceivable that the user himself moves relative to mobile communication apparatus 20. Taking this into account, mobile communication apparatus 20 may detect an image of the user in image processing and determine the display section that the user is viewing at on the basis of temporal change in the image of the user.

The exemplary embodiments have been described above. The present invention, however, is not limited only to these exemplary embodiments, and it is also possible to use a combination of these exemplary embodiments or change a part of the configuration within the technical spirit of the present invention.

This application claims the benefit of priority based on Japanese Patent Application 2009-214440 filed on Sep. 16, 2009 and Japanese Patent Application 2009-237075 filed on Oct. 14, 2009, the disclosure of which is hereby incorporated by reference thereto in its entirety.

The invention claimed is:

1. A mobile information apparatus comprising:
   multiple displays whose display surfaces are arranged side by side;
   a measurement section that measures orientation information about apparatus orientation; and
   a control section that determines the display surface that the user is viewing from among said multiple displays, based on the orientation information measured by said measurement section, and causes the display surface of displays, other than the display surface determined as being viewed by the user, to become darker than the display surface on the display that is determined as being viewed by the user,
   wherein the display surfaces of said multiple displays mutually form a relative angle smaller than 180 degrees;
   said control section determines a display surface within a predetermined angle range from a predetermined reference plane as a display surface that the user is viewing;
   said measurement section detects the inclination of the display surface of any one display; and
   said control section calculates the inclinations of the display surfaces of the other displays on the basis of the inclination of the display surface of the display detected by said measurement section and the relative angle.

2. A mobile information apparatus comprising:
   multiple displays whose display surfaces are arranged side by side;
   a measurement section that measures orientation information about apparatus orientation; and
   a control section that determines the display surface that the user is viewing from among said multiple displays, based on the orientation information measured by said measurement section, and causes the display surface of displays, other than the display surface determined as being viewed by the user, to become darker than the display surface on the display that is determined as being viewed by the user,
   wherein the display surfaces of said multiple displays mutually form a relative angle smaller than 180 degrees;
   said measurement section takes an image in the forward direction of the display surface of at least one display as the orientation information; and
   said control section determines which display surface, from among said multiple displays, the user is viewing on the basis of the image taken by said measurement section.

3. A mobile information apparatus comprising:
   multiple displays whose display surfaces are arranged side by side;

a measurement section that measures orientation information about apparatus orientation; and a control section that determines the display surface that the user is viewing from among said multiple displays, based on the orientation information measured by said measurement section, and causes the display surface of displays, other than the display surface determined as being viewed by the user, to become darker than the display surface on the display that is determined as being viewed by the user;

wherein the display surfaces of said multiple displays mutually form a relative angle smaller than 180 degrees;

said measurement section takes an image in the forward direction of the display surface of at least one display as the orientation information;

said control section determines which display surface, from among said multiple displays, the user is viewing on the basis of the image taken by said measurement section;

said multiple displays may be comprised of a first display and a second display whose display surfaces are arranged mutually to form a relative angle smaller than 180 degrees are provided;

said measurement section takes an image in front of the display surface of said first display; and said control section determines that the user is looking at the display surface of said first display if the image taken by said measurement section shows that the user is directly facing the display surface of said first display, and determines that the user is viewing at the display surface of said second display if the image shows that the user is facing the display surface of said second display.

4. A mobile information apparatus comprising:

multiple displays whose display surfaces are arranged side by side;

a measurement section that measures orientation information about apparatus orientation; and a control section that determines the display surface that the user is viewing from among said multiple displays, based on the orientation information measured by said measurement section, and causes the display surface of displays, other than the display surface determined as being viewed by the user, to become darker than the display surface on the display that is determined as being viewed by the user, wherein the display surfaces of said multiple displays mutually form a relative angle smaller than 180 degrees;

said measurement section takes an image in the forward direction of the display surface of at least one display as the orientation information;

said control section determines which display surface, from among said multiple displays, the user is viewing on the basis of the image taken by said measurement section; and said control section additionally or alternatively determines the display surface that the user is viewing on the basis of a temporal change in the image taken by said measurement section.

5. A mobile information apparatus comprising:

multiple displays whose display surfaces are arranged side by side;

a measurement section that measures orientation information about apparatus orientation; and a control section that determines the display surface that the user is viewing from among said multiple displays, based on the orientation information measured by said measurement section, and causes the display surface of displays, other than the display surface determined as being viewed by the user, to become darker than the display surface on the display that is determined as being viewed by the user, wherein the display surfaces of said multiple displays mutually form a relative angle smaller than 180 degrees;

said measurement section takes an image in the forward direction of the display surface of at least one display as the orientation information;

said control section determines which display surface, from among said multiple displays, the user is viewing on the basis of the image taken by said measurement section; and said control section additionally or alternatively determines the display surface that the user is viewing on the basis of a temporal change in the image taken by said measurement section;

said multiple displays may be comprised of a first display and a second display whose display surfaces are arranged mutually form a relative angle smaller than 180 degrees are provided, the display surface of said first display and the display surface of said second display being arranged on both sides of a predetermined axis; and said control section detects a turning operation of the mobile information apparatus around the axis from the temporal change in the image, and additionally or alternatively determines the display surface that the user is viewing on the basis of the turning operation.

6. A mobile information apparatus comprising:

multiple displays whose display surfaces are arranged side by side;

a measurement section that measures orientation information about apparatus orientation; and a control section that determines the display surface that the user is viewing from among said multiple displays, based on the orientation information measured by said measurement section, and causes the display surface of displays, other than the display surface determined as being viewed by the user, to become darker than the display surface on the display that is determined as being viewed by the user, wherein there are two of said multiple displays, said two displays being implemented in two cases openably and closably connected via a hinge, respectively, such that the display surfaces are arranged facing each other when said two cases are in a closed state and are arranged side by side when said two cases are in an open state;

the mobile information apparatus further comprises an open/close detection section that detects whether said two cases are open at a relative angle of 180 degrees or at a relative angle smaller than 180 degrees when said two cases are open; and said control section determines which display surface of a display the user is viewing on the basis of the apparatus orientation obtained from the orientation information detected by said measurement section when said two cases are open at a relative angle smaller than 180 degrees, and determines the display surface the user is viewing at on the basis of a temporal change in the apparatus orientation when said two cases are open at a relative angle of 180 degrees.

7. A mobile information apparatus comprising:

multiple displays whose display surfaces are arranged side by side;

a measurement section that measures orientation information about apparatus orientation; and a control section that determines the display surface that the user is viewing from among said multiple displays, based on the orientation information measured by said measurement section, and causes the display surface of displays, other than the display surface determined as being viewed by the user, to become darker than the display surface on the display that is determined as being viewed by the user, wherein there are two of said multiple displays, said two displays being implemented in two cases openably and closably connected via a hinge, respectively, such that the display surfaces are arranged facing each other when said two cases are in a closed state and are arranged side by side when said two cases are in an open state;

the mobile information apparatus further comprises an open/close detection section that detects whether said two cases are open at a relative angle of 180 degrees or at a relative angle smaller than 180 degrees when said two cases are open;

said control section determines which display surface of a display the user is viewing on the basis of the apparatus orientation obtained from the orientation information detected by said measurement section when said two cases are open at a relative angle smaller than 180 degrees, and determines the display surface the user is viewing at on the basis of a temporal change in the apparatus orientation when said two cases are open at a relative angle of 180 degrees;

the display surfaces of said two displays are arranged on both sides of a predetermined axis; and the temporal change in the apparatus orientation is a turning operation around the axis.

8. A display control method for a mobile information apparatus including multiple displays whose display surfaces are arranged side by side, comprising:

measuring orientation information with respect to apparatus orientation;

determining which display surface, from among multiple displays, the user is viewing based on the basis of the measured orientation information; and causing a display surface of displays, other than the display surface determined as being viewed by user, to become darker than the display surface of the display determined as being viewed by the user, wherein the display surfaces of the multiple displays mutually form a relative angle smaller than 180 degrees;

an image in the forward direction of the display surface of at least one display is taken as the orientation information; and which of the multiple displays the user is looking at the display surface that the user is viewing, from among multiple displays, is determined on the basis of the taken image.

9. A display control method for a mobile information apparatus including multiple displays whose display surfaces are arranged side by side, comprising:

measuring orientation information with respect to apparatus orientation;

determining which display surface, from among multiple displays, the user is viewing based on the basis of the measured orientation information; and causing a display surface of displays, other than the display surface determined as being viewed by user, to become darker than the display surface of the display determined as being viewed by the user, wherein the display surfaces of the multiple displays mutually form a relative angle smaller than 180 degrees;

an image in the forward direction of the display surface of at least one display is taken as the orientation information;

which of the multiple displays the user is looking at the display surface that the user is viewing, from among multiple displays, is determined on the basis of the taken image;

said multiple displays may be comprised of a first display and a second display whose display surfaces are mutually form a relative angle smaller than 180 degrees;

an image in front of the display surface of the first display is taken; and it is determined that the user is looking at the display surface of the first display if the taken image shows that the user is directly facing the display surface of the first display, and it is determined that the user is viewing at the display surface of the second display if the image shows that the user is facing the display surface of the second display.

10. A display control method for a mobile information apparatus including multiple displays whose display surfaces are arranged side by side, comprising:

measuring orientation information with respect to apparatus orientation;

determining which display surface, from among multiple displays, the user is viewing based on the basis of the measured orientation information; and causing a display surface of displays, other than the display surface determined as being viewed by user, to become darker than the display surface of the display determined as being viewed by the user, wherein the display surfaces of the multiple displays mutually form a relative angle smaller than 180 degrees;

an image in the forward direction of the display surface of at least one display is taken as the orientation information;

which of the multiple displays the user is looking at the display surface that the user is viewing, from among multiple displays, is determined on the basis of the taken image; and the display surface that the user is viewing at is determined additionally or alternatively on the basis of a temporal change in the taken image.

11. A display control method for a mobile information apparatus including multiple displays whose display surfaces are arranged side by side, comprising:

measuring orientation information with respect to apparatus orientation;

determining which display surface, from among multiple displays, the user is viewing based on the basis of the measured orientation information; and causing a display surface of displays, other than the display surface determined as being viewed by user, to become darker than the display surface of the display determined as being viewed by the user, wherein there are two of the displays, the two displays being implemented in two cases openably and closably connected via a hinge, respectively, such that the display surfaces are arranged facing each other when the two cases are in a closed state and are arranged side by side when the two cases are in an open state;

it is detected whether the two cases are open at a relative angle of 180 degrees or at a relative angle smaller than 180 degrees when the two cases are open; and the display surface of the display the viewer is viewing is determined on the basis of the apparatus orientation when the two cases are open at a relative angle smaller than 180 degrees, and the display surface the user is looking at is determined on the basis of temporal change in the apparatus orientation when the two cases are open at a relative angle of 180 degrees.

* * * * *